United States Patent
Tang

(10) Patent No.: US 8,549,277 B2
(45) Date of Patent: Oct. 1, 2013

(54) SERVER SYSTEM INCLUDING DIPLEXER

(75) Inventor: Chiang-Chung Tang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 518 days.

(21) Appl. No.: 12/884,208

(22) Filed: Sep. 17, 2010

(65) Prior Publication Data

US 2012/0011355 A1 Jan. 12, 2012

(30) Foreign Application Priority Data

Jul. 12, 2010 (CN) .......................... 2010 1 0223145

(51) Int. Cl.
*G06F 9/00* (2006.01)

(52) U.S. Cl.
USPC ............................................ 713/100; 713/1

(58) Field of Classification Search
USPC ...................................................... 713/100, 1
See application file for complete search history.

(56) References Cited

U.S. PATENT DOCUMENTS

| 8,386,764 | B2* | 2/2013 | Li et al. ........................ 713/100 |
| 2005/0071461 | A1* | 3/2005 | Mihm et al. ................. 709/224 |
| 2006/0212694 | A1* | 9/2006 | Koizumi .......................... 713/2 |
| 2007/0234123 | A1* | 10/2007 | Shih et al. ....................... 714/36 |
| 2008/0059784 | A1* | 3/2008 | Fu ..................................... 713/2 |
| 2008/0256400 | A1* | 10/2008 | Yang et al. ..................... 714/57 |
| 2010/0228960 | A1* | 9/2010 | Huang et al. ................. 713/100 |
| 2010/0306357 | A1* | 12/2010 | Chen ............................. 709/223 |

\* cited by examiner

*Primary Examiner* — Chun Cao
(74) *Attorney, Agent, or Firm* — Altis & Wispro Law Group, Inc.

(57) ABSTRACT

A server system includes a BMC, a BIOS chip, an IPMI and a diplexer. The BMC includes a first chip-selecting signal output terminal, a second chip-selecting signal output terminal, a first updating output terminal and a controlling input terminal. The BIOS chip includes a second chip-selecting signal input terminal and an updating input terminal. The IPMI has a controlling output terminal. The diplexer includes a first input terminal and an updating output terminal. The first input terminal of the diplexer is electrically coupled to the first updating output terminal of BMC. The updating output terminal of the diplexer is electrically coupled to the updating input terminal of the BIOS chip. The controlling output terminal of the IPMI is electrically coupled to the controlling input terminal of the BMC. The second chip-selecting signal input terminal of the BIOS chip is electrically coupled to the second chip-selecting signal output terminal of the BMC.

8 Claims, 3 Drawing Sheets

SERVER SYSTEM INCLUDING DIPLEXER

BACKGROUND

1. Technical Field

The disclosure relates generally to server systems, and more particularly to a server system with a diplexer.

2. Description of the Related Art

A Baseboard Management Chip (BMC) is configured for monitoring a server system. Sometimes, shutdown of the server system is caused by errors of the Basic Input/Output system (BIOS). However, when such a shutdown takes place, the BMC only records the BIOS error event without providing any remedial measures therefor. Thus, what is called for is a server system with a diplexer that can overcome the disadvantage described.

DETAILED DESCRIPTION

Figure 1:
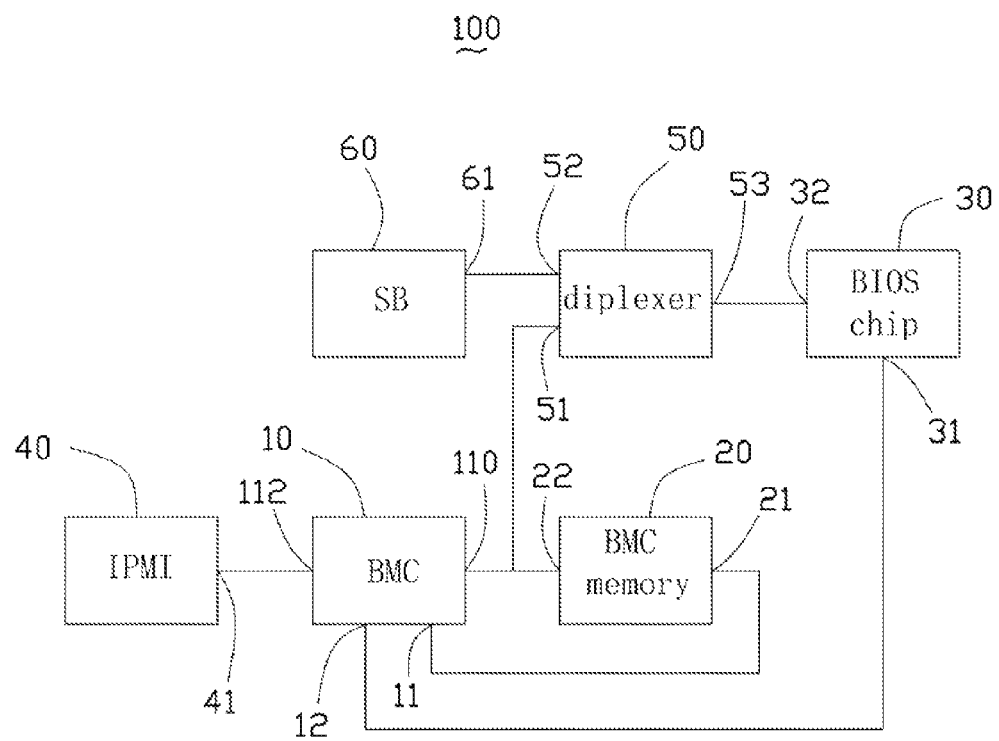
FIG. 1 is a block diagram of a server system in accordance with one embodiment of the disclosure.

Referring to FIG. 1, a server system 100 includes a Baseboard Management Chip (BMC) 10, a BMC memory 20, a Basic Input/Output System (BIOS) chip 30, an Intelligent Platform Management Interface (IPMI) 40, a diplexer 50 and a Southbridge chip 60 (SB).

The BMC 10 is configured for monitoring each device in server system 100, such as a central processing unit. The BMC 10 includes a first chip-selecting signal output terminal 11, a second chip-selecting signal output terminal 12, a first updating output terminal 110 and a controlling input terminal 112.

The BMC memory 20 is configured for recording status of all devices in the server system 100 that are monitored by the BMC 10.

When a shutdown event of the server system 100 occurs, the event is recorded in the BMC memory 20, such as the reason for the shutdown event. The BMC memory 20 includes a first chip-selecting signal input terminal 21 and a first updating input terminal 22. The first chip-selecting signal input terminal 21 is electrically coupled to the first chip-selecting signal output terminal 11. The first updating input terminal 22 is electrically coupled to the first updating output terminal 110 of the BMC 10.

The BIOS chip 30 includes BIOS software. The BIOS chip 30 is configured for saving input/output programs and is also known as a system BIOS or ROM BIOS. BIOS software is stored on a memory chip, such as ROM/EEPROM chip, collectively known as the BIOS chip 30, and the BIOS chip 30 having several pins as terminals. The BIOS chip 30 includes a second chip-selecting signal input terminal 31 and an updating input terminal 32. The second chip-selecting signal input terminal 31 is electrically coupled to the second chip-selecting signal output terminal 12.

The IPMI 40 is configured for directing the first chip-selecting signal output terminal 11 and the second chip-selecting signal output terminal 12 to provide a chip-selecting signal. The IPMI 40 includes a controlling output terminal 41. The controlling output terminal 41 is electrically coupled to the controlling input terminal 112 of the BMC 10.

The diplexer 50 includes a first input terminal 51, a second input terminal 52 and an updating output terminal 53. The first input terminal 51 is electrically coupled to the first updating output terminal 110 of the BMC 10. The updating output terminal 53 is electrically coupled to the updating input terminal 32 of the BIOS chip 30.

The Southbridge chip 60 includes a second updating output terminal 61 configured for providing an update signal to the diplexer 50. The second updating output terminal 61 is electrically coupled to the second input terminal 52 of the diplexer 50.

Figure 2:
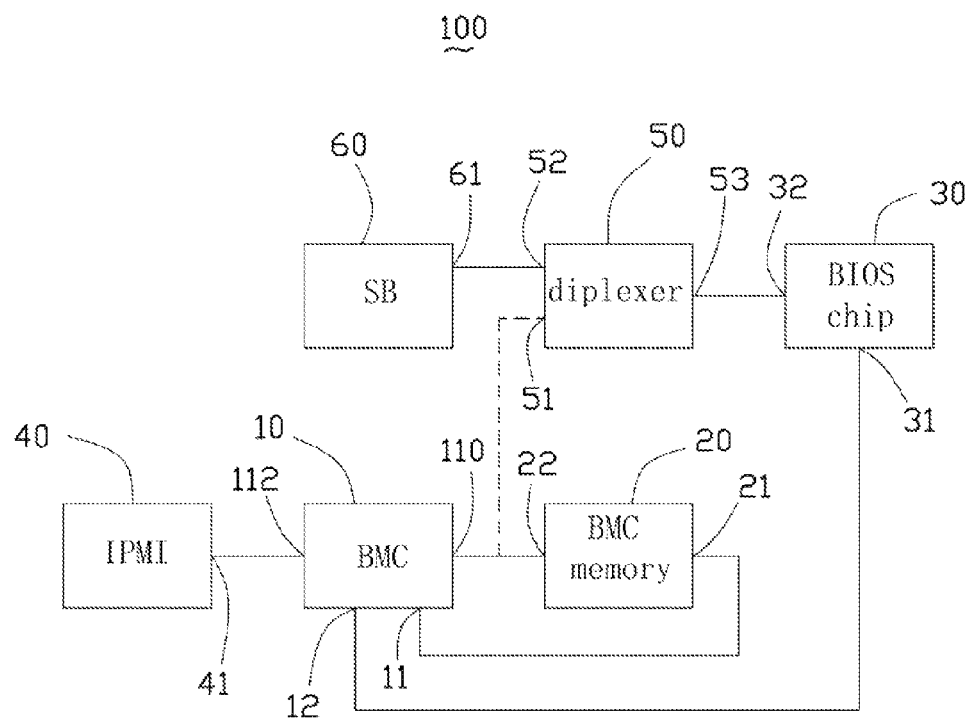
FIG. 2 is a block diagram of the server system in FIG. 1 in normal operation.

Referring to FIG. 2, in the standard BIOS updating process of the server system 100, the controlling output terminal 41 provides a control signal to the controlling input terminal 112. The first chip-selecting signal output terminal 11 provides a chip-selecting signal to the first chip-selecting signal input terminal 21 according to the signal from the IPMI 40.

The first updating output terminal 110 of the BMC 10 provides an update signal to the first updating input terminal 22 for updating the BIOS memory 20.

Simultaneously, the second updating output terminal 61 provides an update signal to the second input terminal 52. The update signal is transmitted to the updating input terminal 32 through the updating output terminal 53. Thus, the BIOS chip 30 is updated.

Figure 3:
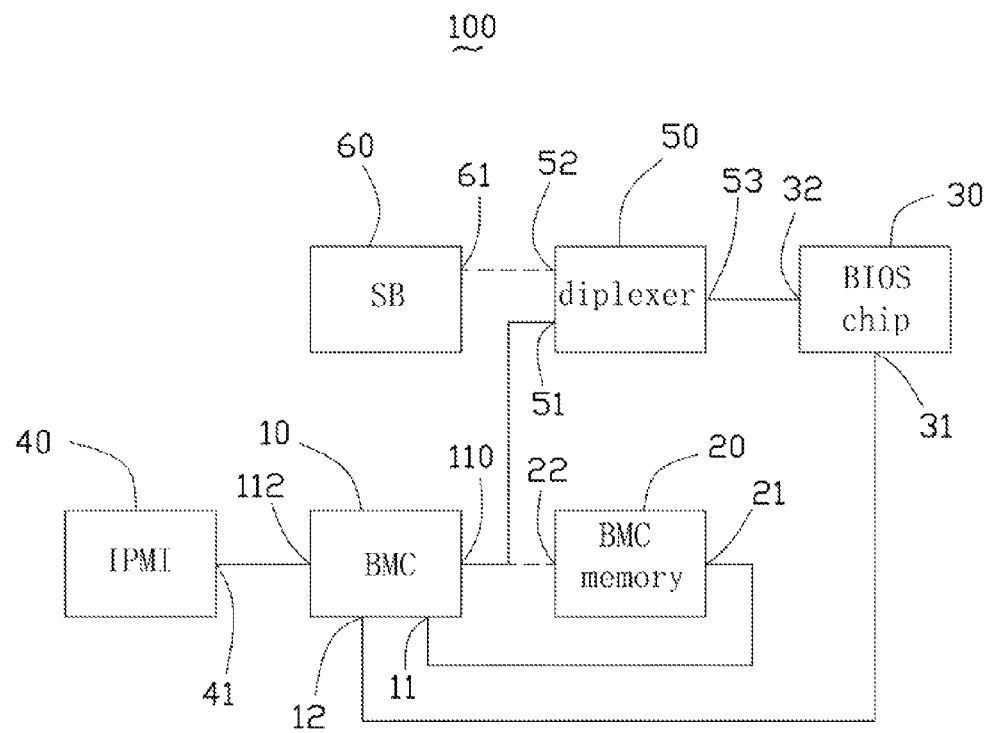
FIG. 3 is a block diagram of the server system in FIG. 1 with a shutdown event occurring.

Referring to FIG. 3, when a shutdown event of the server system 100 occurs, the Southbridge chip 60 stops working. Simultaneously, the controlling output terminal 41 provides a control signal to the controlling input terminal 112. The second chip-selecting signal output terminal 12 provides a chip-selecting signal to the second chip-selecting signal input terminal 31. The first updating output terminal 110 provides an update signal to the first input terminal 51 of the diplexer 50. The update signal is transmitted to the second updating input terminal 32 of the BIOS chip 30 through the update signal terminal 53 of the diplexer 50. Accordingly, the BIOS chip 30 is updated.

While the disclosure has been described by way of example and in terms of exemplary embodiment, it is to be understood that the disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A server system comprising:
   a baseboard management chip (BMC) comprising a first chip-selecting signal output terminal, a second chip-selecting signal output terminal, at first updating output terminal and a controlling input terminal;
   a basic input/output system (BIOS) chip comprising a second chip-selecting signal input terminal and an updating input terminal;
   an intelligent platform management interface (IPMI) comprising a controlling output terminal; and
   a diplexer comprising a first input terminal and an updating output terminal, the first input terminal of the diplexer electrically coupled to the first updating output terminal of BMC, the updating output terminal of the diplexer electrically coupled to the updating input terminal of the BIOS chip, the controlling output terminal of the IPMI electrically coupled to the controlling input terminal of the BMC, the first chip-selecting signal output terminal electrically coupled to a first chip-selecting signal input terminal of a BMC memory, and the second chip-selecting signal input terminal of the BIOS chip electrically coupled to the second chip-selecting signal output terminal of the BMC.

2. The server system as claimed in claim 1, wherein the controlling output terminal of the IPMI provides a control signal to the controlling input terminal of the BMC when a shutdown event of the server system occurs, the second chip-selecting signal output terminal of the BMC providing a chip-selecting signal to the second chip-selecting signal input terminal of the BIOS chip according to the control signal from the IPMI, the first updating output terminal of the BMC providing an update signal to the first input terminal of the diplexer, the update signal transmitted to the updating input terminal of BIOS chip for updating the BIOS chip, the update signal transmitted to the updating input terminal of BIOS chip through the update signal output terminal of the diplexer.

3. The server system as claimed in claim 1, further comprising a Southbridge chip comprising a second updating output terminal, the diplexer further comprising a second input terminal electrically coupled to the second updating terminal of the Southbridge chip.

4. The server system as claimed in claim 3, wherein the BMC memory further comprises a first updating input terminal, the first updating input terminal of the BMC memory electrically coupled to the first updating output terminal of the BMC.

5. The server system as claimed, in claim 4, wherein when the server system is in normal operation, the controlling output terminal of the IPMI provides a control signal to the controlling input terminal of the BMC, the first chip-selecting signal output terminal of the BMC providing a chip-selecting signal to the first chip-selecting signal input terminal of the BMC memory according to the control signal from the IPMI, the first updating output terminal of the BMC providing a update signal to the first updating input terminal of the BMC memory for updating the BMC memory, the second updating output terminal of the Southbridge chip providing an update signal to the second input terminal of the diplexer, the update signal transmitted to the second updating input terminal of the BIOS chip for updating the BIOS chip, the update signal transmitted to the second updating input terminal of the BIOS chip through the updating output terminal of the diplexer.

6. The server system as claimed in claim 1, wherein the BMC is configured for monitoring all devices in the server system.

7. The server system as claimed in claim 1, wherein the BMC memory is configured for recording status of all devices in the server system.

8. The server system as claimed in claim 4, wherein the first chip-selecting signal output terminal of the BMC and the second chip-selecting signal output terminal of the BMC are directed by the IPMI to provide a chip-selecting signal.

* * * * *